UNITED STATES PATENT OFFICE.

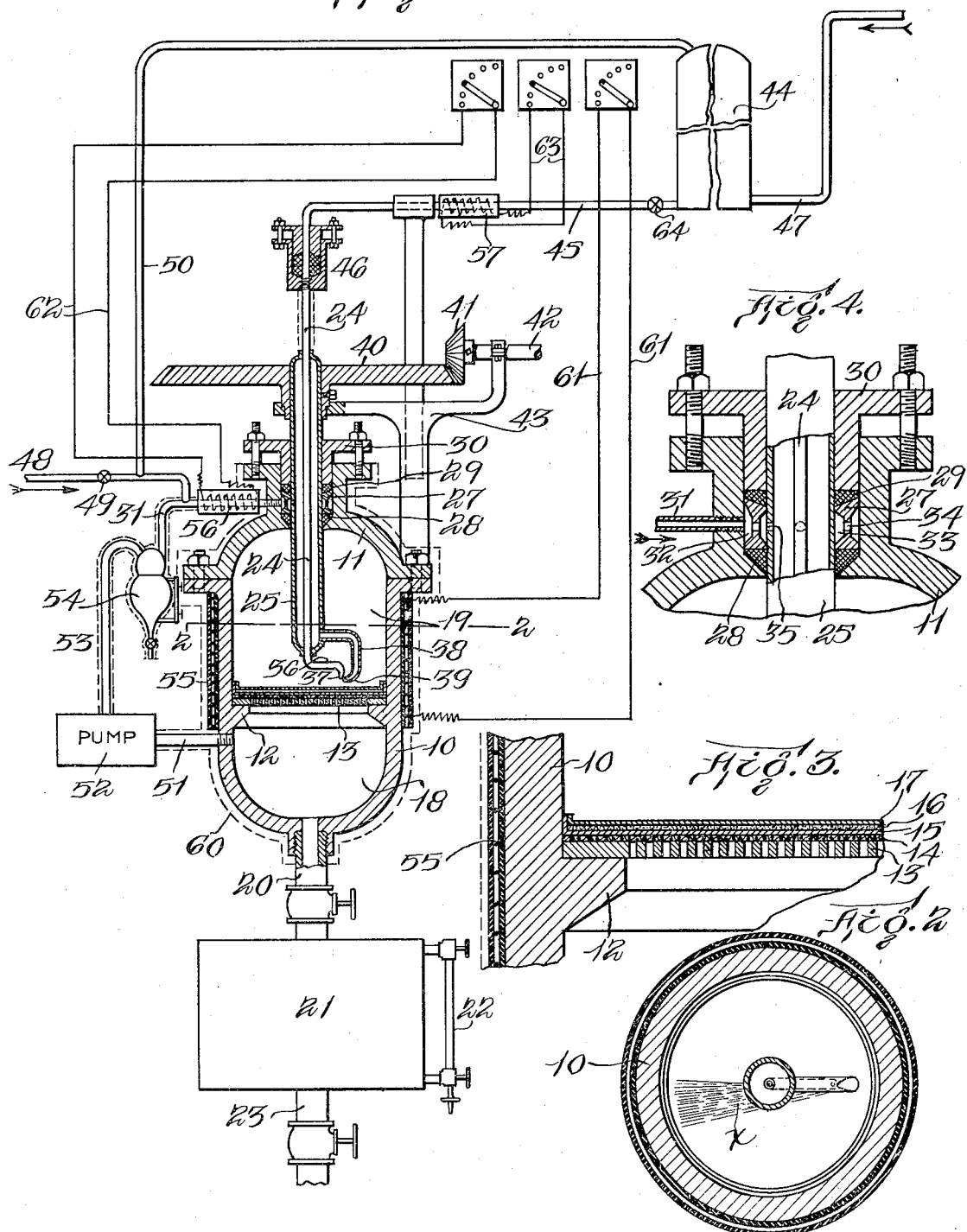

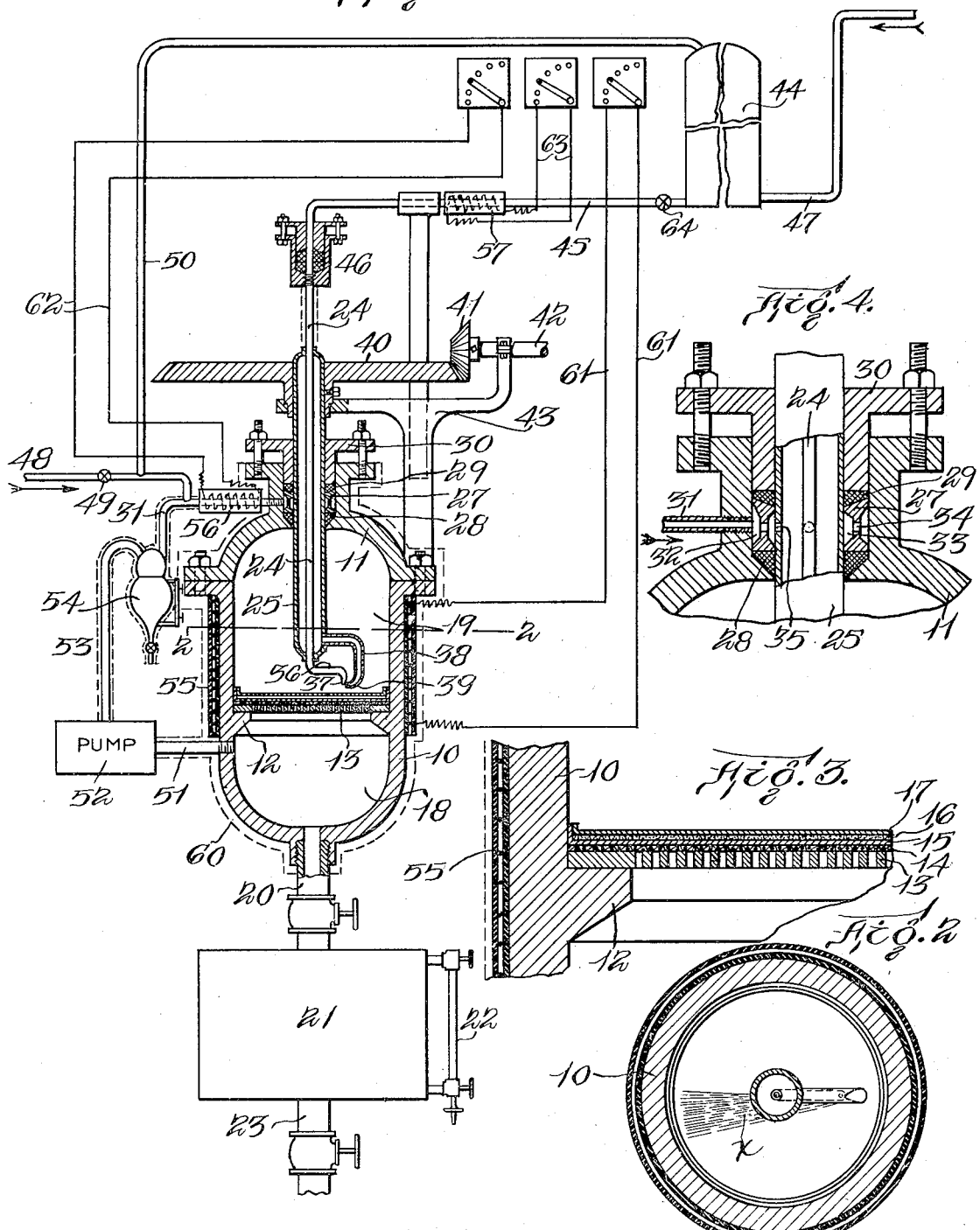

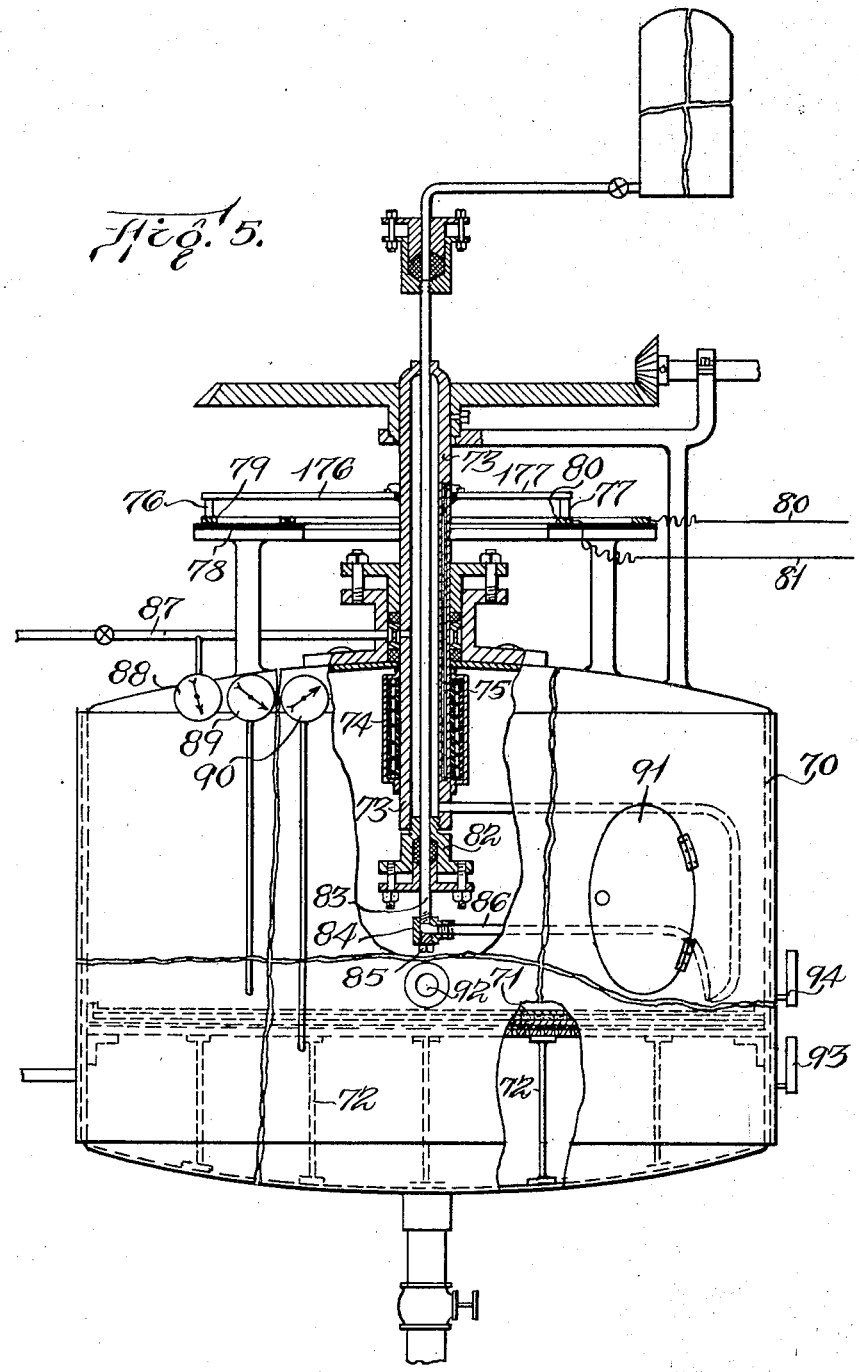

HUGH K. MOORE, OF BERLIN, NEW HAMPSHIRE.

PROCESS AND APPARATUS FOR HYDROGENATING UNSATURATED COMPOUNDS.

1,121,860. Specification of Letters Patent. Patented Dec. 22, 1914.

Application filed February 26, 1914. Serial No. 821,241.

*To all whom it may concern:*

Be it known that I, HUGH K. MOORE, a citizen of the United States, and a resident of Berlin, in the county of Coos and State of New Hampshire, have invented certain new and useful Improvements in Processes and Apparatus for Hydrogenating Unsaturated Compounds, of which the following is a specification.

This invention has for its object to provide a continuous process of hydrogenating oils, the glycerids of fatty acids, the fatty acids and other unsaturated compounds.

On the accompanying drawings, Figure 1 represents more or less diagrammatically an apparatus which I have invented and which may be utilized in carrying out my process. Fig. 2 represents a section on the line 2—2 of Fig. 1. Fig. 3 represents an enlarged section through the diaphragm containing the catalyzer. Fig. 4 represents in detail the connection at the top of the hydrogenation chamber. Fig. 5 represents another form of apparatus for carrying out my process.

For simplicity of phraseology, I shall, in the following specification and claims, refer to the compound to be hydrogenated as "oil," but it will be understood that I mean to include thereby any unsaturated compound, such for instance as the glycerids of fatty acids, the fatty acids, the esters of the fatty acids or any unsaturated hydrocarbons or other unsaturated compounds.

With the forms of apparatus which I have herein shown. I preferably atomize the oil by a blast of hydrogen and bring the mixture of hydrogen and finely divided oil into the presence of and in contact with a catalyzer.

The oil is furnished in a continuous stream into the upper portion of a closed chamber, where it meets the continuous stream or blast and is atomized. The chamber is provided with a pervious filtering diaphragm containing a catalyzer, and the mixture of oil and hydrogen in excess penetrates the diaphragm into contact with the catalyzer whereupon the oil is saturated, and the hydrogenated oil and the excess of hydrogen pass into the lower portion of the chamber. The excess hydrogen may then be freed of oil and reused, and the hydrogenated product withdrawn in a continuous stream. Preferably, as will be subsequently explained, for securing the greatest possible active surface, the catalyzer consists of a layer of finely divided or pulverulent material confined between layers of filtering material. It is difficult to force a large body of oil through such powdery mass, but, when the oil is atomized, it may be forced therethrough without difficulty if the pressure be sufficient. I therefore maintain on two sides of the diaphragm atmospheres of hydrogen, under different pressures, so that a stream of hydrogen is constantly passing through the diaphragm and catalyzer in the direction in which the oil is passed through.

I have found that proper results cannot be obtained after the particles of the catalyzer become covered with films of oil, for the reason that the hydrogen is unable to obtain access thereto, and hence I provide for cleaning the catalyzer of the oil and revivifying it. This is accomplished by causing the constant passage of hydrogen therethrough, and also by arranging the nozzles for the oil and hydrogen in such manner and so moving them that the spray is directed progressively toward restricted areas of the catalyzer. Hence, through that portion of the catalyzer which at the moment is not receiving the spray, hydrogen is passing through in such quantities and at such velocity as to blow off or remove the films or coatings of oil which inclose the particles thereof. Thus each restricted portion of the catalyzer first receives the mixture of oil and hydrogen, and is then freed of the oil, either as such or in saturated or partially saturated condition. Moreover, by so doing, the quantity of oil which any one portion of the diaphragm and the catalyzer is receiving is relatively small, and the oil is so broken up and mixed with the hydrogen that it is carried therethrough and hydrogenated instantaneously. By regulating the oil supply, I am able to regulate the degree of solidity of the hydrogenated product to any predetermined point according to the use for which it is intended.

I wish to have it clearly understood that my invention is capable of being practised in many ways, that I am not limited to the employment of the particular forms of apparatus which I have illustrated and shall hereinafter describe, and that the phraseology which I have adopted is for the purpose of description and not of limitation. I have shown on the drawings certain forms of apparatus which are best now known by me for carrying out my process, but I have not attempted to show them in their exact proportions or relative sizes.

Referring to the drawings and particularly to Fig. 1, a small size apparatus is shown capable of producing about 150 pounds of hydrogenated oil per day of 24 hours. This apparatus consists of a cast metal casing 10 having a cover 11 to form a substantially cylindrical chamber. The chamber is transversely divided or partitioned by a filter diaphragm containing the catalyzer. As shown, the casing has an interior flange 12 upon which the diaphragm rests. The diaphragm, as illustrated, consists of a perforated plate 13 upon which rests a layer 14 of wire cloth, preferably about 100-mesh. Upon the wire cloth is a thin layer 15 of suitable inert material such as a mat of asbestos fiber, or asbestos paper or cloth, or other filtering material which will not decompose under the influence of the heat in the casing or dissolve in the oil. Then, upon the layer of asbestos is a thin layer 16 of the catalyzer, and upon this is superimposed another layer 17 such as asbestos, or a layer of wire cloth of a very fine mesh. The lower layer 15 operates as a filter to prevent the catalyzer from passing through it, the upper layer 17 serving to hold the catalyzer in place and protect it from being displaced by the blast of the oil and hydrogen. The perforated plate and the wire cloth are merely for the purpose of sustaining the weight of the layers above them and against the pressures to which they are subjected from above. I do not confine myself, however, to the particular form of diaphragm which I have described, as any other form which is impervious to the catalyzer and pervious to the oil and hydrogen may be employed.

As a catalyzer I may employ substantially any of the usual metals, such as palladium, platinum, copper, nickel, iron, etc., although I prefer to use nickel. These materials may be termed "metallic" catalyzers, although by such term I do not mean necessarily that the substances are in their metallic forms, since they may be present as hydrids or salts of the metals. In making the diaphragm, a layer of nickel in the form of oxid is spread to the proper thickness upon the layer 15 of asbestos, the oxid being in finely divided condition, preferably so that it will pass through a 100-mesh sieve. After the diaphragm is formed, the oxid is reduced by hydrogen at a temperature of approximately 570° F. In lieu of first using the catalyzer in the form of an oxid, before its reduction by hydrogen, I may use any other suitable metallic compound, such as the nitrite, the nitrate, the hydrate, the formate, the oxalate, etc., of the metal. While I am unable completely to substantiate it, to my satisfaction, I am of the opinion that the catalyzer, after being treated as described, is in the form of nickel hydrid rather than nickel in a nascent state. I have hereinafter stated several reasons.

The diaphragm divides the chamber within the casing into two compartments 18 and 19, and from the lower compartment 18 leads a valved conduit 20 for the hydrogenated product. The conduit communicates with a receptacle 21 having a gage 22 and provided with a valved discharge outlet 23, leading to a trap (not shown) whereby the outflow of hydrogenated product may be continuous.

The oil and the hydrogen are introduced into the upper compartment 19 through the cover 11 by concentric pipes. The oil pipe is indicated at 24 and the pipe for the hydrogen at 25. Surrounding the pipe 25, and between it and the neck 26 of the cover, there is a chambered collar or lantern gland 27 located between packings indicated at 28, 29. The follower 30 is secured to the neck in the usual fashion. Hydrogen is introduced through the neck of the cover by a pipe 31 which opens into the outer chamber 32 formed by the lantern gland and passes therefrom to an inner chamber 33 through radial apertures 34. The shaft 25 has an aperture 35 communicating with the inner chamber 33. The upper and lower ends of the pipe 25 are preferably closed and welded to the pipe 24. The lower end of the pipe 24 has a lateral extension 36 terminating in a narrow slit or nozzle 37, and from the pipe 25 there is a lateral extension 38 terminating in a nozzle 39 closely adjacent the nozzle 37. By an examination of Fig. 2, it will be observed that these nozzles are so located that the stream or blast of hydrogen, traveling at high velocity, impinges upon or engages the stream of oil flowing from the nozzle 37 and atomizes the latter, directing the spray across the surface of the diaphragm. In outline and in plan view, the spray is in the form of a segment with one outer radius approximately intersecting the axis or median longitudinal line of the casing as indicated at $x$. Instead of using only one pair of nozzles for the hydrogen and oil, I have contemplated increasing the number and of arranging them upon different radial arms, this depending of course upon the area of the diaphragm and the width of the atomized spray. I provide means for slowly rotating the pipes 24 and 25 so as to cause the nozzles to revolve and thus direct the spray progressively in a circle over the entire surface of the diaphragm. To this end, any suitable mechanism may be utilized for effecting the rotation of the pipes. I have shown a large gear 40 intermeshing with and driven by a small bevel pinion 41 on a shaft 42. The hub of the gear 40 is secured in any suitable way to the shaft 25 and it is mounted upon a bracket 43, which also serves to form a bearing for the shaft 42. It is, of course, immaterial how the relative movements of the nozzles and the diaphragm are secured. It could be accomplished by rotating the casing and holding the nozzles stationary.

The oil is supplied from a tank 44 through a pipe 45 rotatably jointed to the shaft 24. As a matter of detail, I have shown the shaft 24 as being provided with a stuffing box 46 rigidly secured thereto so as to rotate therewith, and into the box projects the end of a pipe 45. Oil is pumped to the tank 44, as needed, through a conduit 47. The hydrogen is supplied from the tank (not shown) through a pipe 48 valved as at 49. The hydrogen is under high pressure, for instance 100 pounds to the square inch; and hence, to insure the proper delivery of the oil, I provide a branch pipe 50 leading from the pipe 48 to the top of the tank 44 to force oil therefrom under pressure. The pipe 48 is connected to the pipe 31, as shown. From the chamber 18, a circulating pipe 51 leads to a compression pump 52 which draws the hydrogen from the chamber and delivers it through a pipe 53 to a separator 54 by which it is freed from any entrained oil. The receiving end of the pipe 31 is connected to the separator so that the hydrogen is circulated through the casing, additional hydrogen being supplied as needed from the pipe 48.

I provide means for heating both the oil and the hydrogen. Any suitable heating means may be utilized for this purpose. For instance, I may employ an electric heating coil 55 encircling the casing, a like coil 56 encircling the pipe 31 for heating the hydrogen, and a similar coil 57 around the pipe 45 for heating the oil. Preferably I employ coils made of nickel chromium wire, suitably insulated by mica from the metal parts which they inclose, and incase them in a jacket or covering of any suitable heat-insulating material such as magnesia. In fact, I have shown the entire casing 10 as being inclosed in a casing 60 of magnesia or other suitable material. The several pairs of conductors 61, 61, 62, 62 and 63, 63 for the coils are connected to a suitable switchboard by which the current therethrough may be regulated to secure the desired amount of heat. I find that it is desirable that the temperature within the compartment 19 of the casing should be approximately 475° to 480° F. in making soap stock, although of course this may vary. For edible fats, a temperature of 300° to 350° F. may be used, although a much lower temperature may be maintained if desired. Care should be taken not to heat the oil or the reduced product to a temperature at which it will burn or become carbonized. After the chamber has been heated to the proper temperature, it is possible to shut off the current through the coil 55 and to depend upon the coils 56 and 57 for furnishing sufficient heat for the reaction. In fact, as I will subsequently explain, proper results may be secured by heating only the hydrogen prior to its delivery from the nozzle. So far as I have at present observed, because of mechanical difficulties in preventing the leakage of hydrogen, the optimum pressure in the chamber 19 is approximately 60 pounds to the square inch, and the pressure in the chamber 18 is approximately 40 pounds to the square inch, although of course these pressures may vary. Assuming, for example, for complete hydrogenation, that to 1 cubic foot of pure olein about 180 cubic feet of hydrogen is required, it will be seen that it is highly desirable that the hydrogen should be supplied under high pressure so as to compact within a small space an otherwise large volume of hydrogen. It is for this reason, as well as others, that I preferably maintain the pressure in the upper compartment 19 at about 60 pounds to the square inch. These pressures may, of course, vary, but it is preferable that there should be a sufficient difference in pressure on the two sides of the diaphragm to insure the passage of the mixture through the diaphragm and the revivifying of the catalyzer, as hereinafter explained, by the blowing of hydrogen therethrough, and a sufficient difference in pressure between the upper compartment and the supply pipe 31 to insure a powerful blast of hydrogen issuing from the nozzle for the atomization of the oil.

In operation, the oil, such as cotton-seed oil, fish oil, or the like, is fed under pressure continuously from the tank 44 through the pipes 45 and 24 to the nozzle 37. At the same time, hydrogen is continuously supplied through the pipe 31 at a pressure of approximately 80 pounds. Passing through the pipe 25 to the nozzle 39 the blast of hydrogen meets the stream of oil and breaks it up into a finely divided state or atomizes it and mixing with it blows it across a relatively restricted area of the diaphragm. The pressure of the hydrogen atmosphere in the compartment 19 is, as I have explained, preferably approximately 60 pounds, so that the oil and hydrogen are forced through the diaphragm into intimate contact with the catalyzer, and more or less of the oil is reduced by the hydrogen. At the same time the excess hydrogen blows through that portion of the diaphragm which for the moment is not receiving the spray and removes from the particles of the catalyzer the films or coatings of oil if any remain thereon. The hydrogen, which reaches the compartment 18 (in which the atmosphere of hydrogen is at a low pressure), together with any entrained oil, is pumped therefrom by the pump 52 and through the separator 54 back to the pipe 25. The loss of hydrogen, due to its reaction with the oil, is made up by a supply of fresh hydrogen from the pipe 48, the supply being controlled by the valve 49. The hydrogenated oil, which is delivered to the compartment 18, passes therefrom into the receptacle 21 through the delivery conduit 20 and is withdrawn as required. By regulating the supply of oil from the tank 44, as by a valve 64, I am able to control the degree of solidity of the hydrogenated product. If desirable, I may deliver the product practically in a solid state or in a semi-liquid state.

It is unnecessary with my process to pass the oil through the diaphragm more than once, but of course, should the hydrogenation be not so complete as desired for any cause, it may be circulated through the spray nozzle and diaphragm by a pump and suitable pipe connections. After the product has been withdrawn from the casing or hydrogenator, it may be bleached and deodorized by any of the well-known processes, but it is unnecessary to subject it to a filter-press operation since it contains none of the catalyzer, the latter being confined and prevented from leaving the diaphragm by the asbestos or other material upon which it is placed. To insure the proper working of the apparatus and prevent the clogging of the nozzles, I find it desirable to remove any chips or scale that there may be in the oil by cleaning it or filtering it prior to its delivery to the supply tank 44.

I have already stated that I am inclined to the belief that the catalyzer is in the form of a hydrid rather than a pure metal. So far as my work has gone, I have been unable to secure any hydrogenation with a metal which does not form a hydrid, such for example as vanadium. Again, when the metal does form a hydrid, it is apparently necessary for the catalytic action for the temperature to be lower than that at which the hydrid decomposes by the action of heat. I believe that, upon reducing the oxid of the metal with hydrogen, there is secured an unstable compound such as the hydrid,—for instance, in reducing NiO with H, the theoretical consumption would be $$NiO+4H=H_2O+NiH_2$$

instead of $$NiO+H_2=Ni+H_2O,$$

but this hydrid has a possibility of absorbing hydrogen to form $$NiH_4, NiH_6 \text{ and } NiH_8.$$

I have not yet isolated these latter theoretical hydrids but believe them to exist. For instance, nickel carbonyl $(Ni(CO)_4)$ corresponds, if $(CO)_4$ were replaced by hydrogen, to $NiH_8$. I think it is the instability of these hydrids and the property of their changing from one hydrid to another, that accounts for the remarkable and confusing action which is termed catalysis in this particular instance. If my theory is correct, the hydrid $NiH_4$ for instance would give off 2H for the hydrogenation of the oil, leaving $NiH_2$, and would again be restored to $NiH_4$ when the hydrogen alone is supplied thereto. This belief is strengthened by the fact that it is possible to revivify the catalyzer completely in the event that the operation of the catalyzer becomes sluggish or ceases altogether. By completely shutting off the supply of oil and continuing the operation of the pump 52 so as to force the hydrogen through the diaphragm and through the catalyzer for a relatively short period of time, say half an hour, it is possible to restore the catalyzer to its initial active condition. In the operation of the apparatus as shown, there is a constant revivifying (and I believe rehydriding) of the catalyzer by forcing the hydrogen through those portions of the catalyzer which are not at the time receiving from the nozzles the mixture of hydrogen and oil. As the nozzles revolve, the atomized spray is delivered progressively over the surface of the diaphragm to those portions of the catalyzer which have been previously revivified or rehydrided. It is possible, on the other hand, that the revivifying is due to the removal of the films of oil from the particles of the catalyzer by the blast of hydrogen, but my observation is that this alone would not account for the surprising results I obtain.

The apparatus shown in Fig. 1 is more especially designed for the production of a relatively small quantity of hydrogenated oil, the casing illustrated being approximately 20 inches high and 12 inches in diameter, interior measurements.

In Fig. 5, I have illustrated an apparatus for yielding a large production of reduced compound and by which my process may be practised. In this apparatus, the casing 70 is made of sheet metal of proper strength and thickness to withstand the pressure, and the diaphragm 71 is supported by struts 72. Instead of heating the casing, I arrange for heating the hydrogen as it is supplied to the nozzle. To this end, I place upon the depending portion of the pipe 73, through which the hydrogen is supplied to the interior of the upper compartment of the casing, a heating coil 74. This coil is located within the upper compartment, and it is placed between layers of insulating material. The coil itself is incased within a sleeve 75 of metal, the ends of which are preferably welded to the pipe 73. The conductors from the opposite ends of the coils pass through one or more passageways formed in the wall of the pipe 73, and are connected to brushes 76, 77 on arms 78, 79 extending outwardly from the pipe 73. An annulus 78 is supported by brackets on top of the casing 70 and is provided with two rings 79 and 80 with which the brushes 77 and 76 respectively engage. Current is supplied to the rings from a suitable generator (not shown) connected with the conductors 80 and 81. To permit cleaning of the pipe 73, its lower end is closed by a stuffing box plug 82 through which the oil pipe 83 passes. At the lower end of the latter pipe, there is a T-coupling 84 closed by a screw plug 85 and connected with the extension 86 provided with the nozzle for the emission of the hydrogen and the atomization of the oil. Connected with the hydrogen pipe 87 which leads to the lantern gland, there is a pressure gage 88, there being similar gages 89 and 90 communicating with the upper and lower compartments of the casing. As a detail of construction, I prefer to provide the casing with a manhole closed by a door 91, which, when open, permits access to the interior of the casing. I also use recording thermometers of any suitable description for recording the temperatures of the compartment of the casing. One or more peepholes, closed by layers of glass, protected by mica as indicated at 92, may be provided for permitting an inspection of the nozzles and the formation of the spray.

So far as I am aware, I am the first to have provided any practical process for effecting a continuous, as opposed to an intermittent, hydrogenation of oil, and particularly of the glycerids of the fatty acids, such as olein and the like. The hydrogenation, considered as a whole, is continuous although it takes place in successive portions of the diaphragm. In each portion of the diaphragm, as the mixture of hydrogen and oil meets the catalyzer, the reaction is practically instantaneous, and the hydrogenated product is immediately forced through and out of the diaphragm into the lower compartment, and such portion of the catalyzer is revivified for the next charge by the passage of hydrogen therethrough.

One of the many advantages which is secured by the process which has been herein outlined, is that it is wholly unnecessary to subject the oil to any handling or beating or shaking. It may be supplied from any storage tanks directly to the supply tank 44 and passes directly therefrom into the casing where it is immediately hydrogenated, so that its physical and chemical qualities are in no wise impaired. Furthermore, by my process, I prevent the breaking down of the glycerids to their fatty acids where olein and like oils are being treated. Furthermore, I may call attention to the fact that a relatively very small quantity of the catalyzer is necessary. For instance, in the apparatus shown in Fig. 1, the entire diaphragm, including the supporting plate need not be over $\frac{3}{16}$ of an inch in thickness, in which case of course the layer of catalyzer is not over $\frac{1}{16}$ of an inch in thickness. Of course care must be taken to insure the integrity of the layer of the catalyzer so that it will not be missing in any portion of the diaphragm. Approximately 5 ounces of nickel will serve for an apparatus such as shown in Fig. 1. In the apparatus shown in Fig. 5, the layer of the catalyzer need be no thicker than in the first-described hydrogenator though of course it may be thicker if desired. With the second form of apparatus in which the casing is approximately 6 feet high and 10 feet in diameter, it is possible to produce approximately 10 tons of hydrogenated product per day.

I desire to call attention to the desirability of securing a very fine division of the oil by the hydrogen in the hydrogenating chamber. By arranging the nozzles very closely together, and blowing the hydrogen through its nozzle at great pressure and high velocity, it is possible so to divide the oil that it is like an almost invisible mist, in which case the oil is, roughly speaking, all surface. Not only does the stream of hydrogen, in impinging upon the oil, break it up, but the expansion of the hydrogen further disrupts the minute particles of oil, so that in effect the oil is practically in a gaseous state, without having been decomposed and without having had latent heat supplied for its gasification. In this state, it is not decomposed by the heat in the chamber, because its passage through the chamber and the diaphragm occupies a small fraction of time, and its reduction and withdrawal are practically instantaneous. This is the optimum condition but of course results may be obtained if the atomization of the oil be not so complete as herein described. It is of course desirable in any case to obtain an intimate mixture of the oil and the hydrogen and in such condition bring them in contact with the catalyzer.

With respect to the catalyzer, it may be pointed out that it is not only not necessary but also undesirable to deposit it in fluffy asbestos or to mix it with or to coat it on such substances as pumice, charcoal or the like. By arranging it in finely divided condition in an unbroken layer or mass, the greatest surface area of the minute particles is exposed for contact with the hydrogen and the oil. But I should not regard it as a departure from my invention should the catalyzer be deposited in asbestos or other equivalent material or mixed with pumice, charcoal or the like, as of course some degree of hydrogenation is secured by such an arrangement. This catalyzing material, either with or without foreign matter such as pumice or the like, is confined in or on what may be termed a filtering diaphragm, in that the latter is composed of material which is pervious to oil and hydrogen, but impervious to the catalyzer, so that when the product is passed through the diaphragm it is free from any catalytic material. In effect, I secure a substantially simultaneous hydrogenation of the oil and filtration of the product, and this operation, so far as the entire apparatus is concerned, is continuous.

As I have previously indicated, a great many changes may be made in the particular forms of apparatus which I have herein illustrated for carrying on my process and the details of construction which I have described may be greatly varied and modified without departing from the spirit and scope of the invention.

What I claim is:

1. A process of hydrogenating oil, which consists in continuously supplying separate streams of oil and hydrogen into contact with a catalyzer and with each other thereby causing the reduction of the oil, revivifying the catalyzer, and withdrawing the hydrogenated product.

2. A process of hydrogenating oil, which consists in atomizing oil with hydrogen, passing said atomized oil and hydrogen into contact with and through a layer of substantially pure finely divided catalyzing material, and withdrawing the hydrogenated product free from admixture with said catalyzing material.

3. A process of hydrogenating oil, which consists in supplying oil and hydrogen to a chamber, mixing the oil and hydrogen, then passing the mixture through a catalyzing material contained within a diaphragm pervious to oil and hydrogen and impervious to said catalyzing material, and withdrawing the hydrogenated product.

4. A process of hydrogenating oil, which consists in continuously supplying oil and hydrogen into a chamber in intimate contact with each other, continuously passing said oil and hydrogen in the same direction through a body of finely divided catalyzer to reduce the oil, and removing the reduced product.

5. A process of hydrogenating oil, which consists in sustaining a layer of finely divided catalyzing material upon a diaphragm impervious to said material but pervious to oil and hydrogen, and continuously passing a mixture of oil and hydrogen in one direction through said catalyzer and said diaphragm to reduce the oil.

6. A process of hydrogenating oil, which consists in forcing a mixture of hydrogen and finely divided oil in one direction through a mass of finely divided catalyzing material and thereby reducing the oil without mixing the catalyzer with the product.

7. A process of hydrogenating oil, which consists in continuously passing a mixture of oil and hydrogen through a catalyzer in one direction to reduce the oil and immediately and continuously passing in the same direction the reduced product through a filter in contact with the catalyzer to prevent the mixing of the catalyzer and the said product.

8. A process of hydrogenating oil, which consists in continuously atomizing oil by a blast of hydrogen, continuously passing the atomized oil and hydrogen through a layer of catalyzing material confined within material impervious to the catalyzing material and impervious to oil and hydrogen to reduce the oil, and withdrawing the hydrogenated product.

9. A process of hydrogenating oil which consists in continuously supplying separate streams of oil and hydrogen, causing said streams to impinge upon each other, and continuously passing the resulting atomized mixture through a layer of substantially pure finely divided catalyzing material confined against admixture with the product.

10. A process of hydrogenating oil which consists in introducing separate streams of hydrogen and oil under pressure into a chamber, causing the stream of hydrogen in excess to impinge upon and atomize the oil in the chamber, forcing the atomized oil and hydrogen under pressure through a catalyzer and thereby hydrogenating the oil, and withdrawing the hydrogenated product and the excess hydrogen from said chamber.

11. A process of hydrogenating oil which consists in introducing separate streams of hydrogen and oil under pressure into a chamber, directing the stream of hydrogen against the stream of oil and thereby atomizing the oil, forcing the mixture of atomized oil and hydrogen through a mass of finely divided, catalyzing material held in a support impervious to said material and pervious to oil and hydrogen and thereby reducing the oil, and withdrawing the hydrogenated product.

12. The herein described process of hydrogenating oil, which consists in continuously directing a stream of mixed atomized oil and hydrogen in a closed chamber upon a diaphragm containing catalyzing material held between layers of material impervious thereto, forcing by pressure the mixture through said diaphragm and said catalyzing material, and withdrawing the hydrogenated product and excess hydrogen from said chamber.

13. The herein described process of hydrogenating oil, which consists in directing a stream of mixed atomized oil and hydrogen in a closed chamber upon successive portions of the surface of a diaphragm containing a catalyzing material, passing said mixture through said successive portions of said diaphragm into contact with successive portions of the catalyzer, and continuously withdrawing the hydrogenated product.

14. The herein described process of hydrogenating oil, which consists in passing hydrogen and oil in alternation through a catalytic body, first to revivify the said body and then to reduce the oil.

15. The herein described process of hydrogenating oil, which consists in passing hydrogen and a mixture of oil and hydrogen in alternation through portions of a catalytic body, thereby alternately revivifying said catalytic body, and hydrogenating oil in said revivified body, and withdrawing the hydrogenated product.

16. The herein described process of hydrogenating oil, which consists in continuously forcing a body of hydrogen through a catalyzer to revivify it, intermittently forcing a mixture of hydrogen and oil in the same direction through such revivified catalyzer, and withdrawing the hydrogenated product and the excess hydrogen.

17. The herein described process of hydrogenating oil, which consists in continuously forcing a stream of hydrogen through a body of catalyzing material, passing a mixture of atomized oil and hydrogen through successive portions of said material thereby hydrogenating said oil and revivifying the catalyzing material alternately in successive portions of said body of material.

18. The herein described process of hydrogenating oil, which consists in directing a stream of oil, in a closed chamber containing hydrogen under pressure, against successive portions of a filtering diaphragm containing a catalyzer, forcing the oil by the pressure of hydrogen into contact with successive portions of the catalyzer, and removing the hydrogenated product from the other side of said diaphragm.

19. The herein described process of hydrogenating oil, which consists in directing a revolving stream of mixed hydrogen and oil, in an atomized condition, in a closed chamber containing hydrogen under pressure, against successive portions of a filtering diaphragm containing a catalyzer, forcing the mixture by the contained hydrogen through said diaphragm into contact with and past successive portions of the catalyzer into a chamber containing hydrogen under a lower pressure, and removing the hydrogenated product from said last-mentioned chamber.

20. The herein described method which consists in hydrogenating oil in the presence of a mass of catalyzing material, and then in forcing a stream of hydrogen at high velocity through the catalyzer to revivify it.

21. The herein described process of removing films of oil from a catalyzer, which consists in passing a stream of hydrogen through said catalyzer.

22. The herein described process, which consists in circulating hydrogen successively through the first and second compartments of a closed chamber separated by a filtering diaphragm containing a catalyzer, maintaining a predetermined pressure in the second chamber, and a predetermined higher pressure in the first chamber, forming a mixture of oil and hydrogen in the atmosphere of hydrogen in the first chamber, whereby the said mixture is passed through said diaphragm by the circulating hydrogen into contact with the said catalyzer, and the hydrogenated product is forced into the second chamber, and withdrawing the hydrogenated product from said second chamber.

23. The herein described process, which consists in first atomizing a stream of oil by a stream of hydrogen into a substantially invisible mist or vapor without gasification, in a closed chamber, then bringing such mixture into contact with a finely divided catalyzer so confined that oil and hydrogen may pass through without carrying the catalyzer with it, whereby the oil is reduced, and withdrawing the hydrogenated product from said chamber.

24. The herein described process, which consists in heating oil, atomizing a stream of the heated oil in a closed chamber by a stream of hydrogen, bringing said atomized oil and hydrogen into contact with a catalyzer confined between material impervious to the catalyzer and pervious to oil and hydrogen, and removing the hydrogenated product.

25. The herein described process which consists in reducing oil with hydrogen in the presence of a catalyzer, and substantially simultaneously therewith filtering such hydrogenated product.

26. A process of hydrogenating oil which consists in simultaneously passing oil and hydrogen through a diaphragm pervious thereto and containing a catalyzer to which it is impervious.

27. A process of hydrogenating oil which consists in simultaneously passing hydrogen and finely divided oil continuously in the same direction through a diaphragm pervious thereto and containing a catalyzer to which it is impervious.

28. A process of hydrogenating oil which consists in passing oil and hydrogen through a catalyzing diaphragm, consisting of layers of material pervious thereto and confining between them a catalytic body to which they are impervious.

29. A process of hydrogenating oil which consists in passing hydrogen through a portion of a diaphragm containing a body of finely divided substantially pure catalyzing material, and subsequently passing oil through said portion of the diaphragm in the same direction.

30. The herein described process which consists in forming a layer of a metallic compound between layers of material impervious thereto but pervious to oil and hydrogen, and passing hydrogen through said layers under proper temperature conditions to reduce said compound to a catalytic state.

31. The herein described process which consists in forming a layer of a metallic compound between layers of material impervious thereto but pervious to oil and hydrogen, passing hydrogen through said layers under proper temperature conditions to reduce said compound to a catalytic state, and then passing oil and hydrogen through said layers to reduce the oil.

32. An apparatus for the hydrogenation of oil, comprising a chamber, a filtering diaphragm therein dividing the chamber into two compartments, a body of catalyzing material confined in said diaphragm, means for introducing oil and hydrogen into one of said compartments, and means for securing a greater pressure in the last-mentioned compartment than in the other compartment.

33. An apparatus for the hydrogenation of oil, comprising a chamber, a diaphragm therein dividing said chamber into two compartments, said diaphragm comprising a layer of filtering material and a layer of catalyzing material, and means by which a mixture of oil and hydrogen may be forced through said diaphragm from one compartment into contact with said catalyzing material and into the other compartment.

34. An apparatus for the hydrogenation of oil, comprising a closed chamber, a diaphragm comprising a body of catalyzing material, and means within said chamber for directing a stream of hydrogen against a stream of oil to atomize the latter, and means by which the atomized oil and hydrogen are forced through said diaphragm.

35. An apparatus for the hydrogenation of oil, comprising a closed casing, a pervious layer of catalyzing material therein, filtering means for sustaining and confining said layer, nozzles in said casing for atomizing a stream of oil by directing a stream of hydrogen thereagainst, and means in consequence of which the atomized oil and hydrogen are passed into contact with and through said catalyzing material.

36. An apparatus for the hydrogenation of oil, comprising a closed casing, a pervious layer of catalyzing material therein, filtering means for sustaining and confining said layer, nozzles in said casing for atomizing a stream of oil by directing a stream of hydrogen thereagainst, means for moving said nozzles to direct the atomized spray toward successive portions of said catalyzing material, and means in consequence of which the atomized oil and hydrogen are passed into contact with and through said catalyzing material.

37. A diaphragm for oil hydrogenating apparatus, comprising a layer of material impervious to a finely divided solid, but pervious to hydrogen and oil, a layer of finely divided solid metallic catalyzing material thereon capable of reducing oil with hydrogen, and means for confining said last-mentioned layer upon said first-mentioned layer.

38. A diaphragm for oil hydrogenating apparatus, comprising a layer of finely divided metallic catalyzing material capable of reducing oil with hydrogen, a supporting layer of asbestos impervious to said material, and a superimposed layer of asbestos.

39. A diaphragm for oil hydrogenating apparatus, comprising a layer of finely divided metallic catalyzing material capable of reducing oil with hydrogen, a supporting layer of asbestos impervious to said material, and one or more layers of foraminous material for supporting the previously mentioned layers.

40. An apparatus for the hydrogenation of oil, comprising a closed casing, a filtering diaphragm therein comprising a layer of catalyzing material, said diaphragm dividing said casing into two compartments, means for atomizing oil in one compartment and maintaining an atmosphere of hydrogen therein at high pressure, and means for circulating the hydrogen from the second compartment back into the first compartment and maintaining an atmosphere of hydrogen in the second compartment at a relatively lower pressure.

41. An apparatus for the hydrogenation of oil, comprising a closed casing, a filtering diaphragm therein comprising a layer of catalyzing material, said diaphragm dividing said casing into two compartments, means for atomizing oil in one compartment and maintaining an atmosphere of hydrogen therein at high pressure, means for circulating the hydrogen from the second compartment back into the first compartment and maintaining an atmosphere of hydrogen in the second compartment at a relatively lower pressure, and means for supplying fresh hydrogen to compensate for losses due to the reduction of the oil.

42. An apparatus for the hydrogenation of oil, comprising a closed casing having a layer of catalyzing material therein, pipes extending into the chamber formed by said casing for streams of oil and hydrogen respectively, adjacent nozzles on said pipes for directing the stream of hydrogen against the stream of oil to atomize the latter, and means for rotating said nozzles to direct the atomized spray into different portions of the said chamber.

In testimony whereof I have affixed my signature, in presence of two witnesses.

HUGH K. MOORE.

Witnesses:
MARCUS B. MAY,
P. W. PEZZETTI.